US012224945B2

(12) United States Patent
Williams

(10) Patent No.: US 12,224,945 B2
(45) Date of Patent: Feb. 11, 2025

(54) ACCELERATED NETWORK PACKET CLASSIFIER

(71) Applicant: MICROSOFT TECHNOLOGY LICENSING, LLC, Redmond, WA (US)

(72) Inventor: Matthew Ian Ronald Williams, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

(21) Appl. No.: 18/138,690

(22) Filed: Apr. 24, 2023

(65) Prior Publication Data

US 2024/0356857 A1    Oct. 24, 2024

(51) Int. Cl.
*H04L 47/2441*    (2022.01)
*H04L 47/20*    (2022.01)

(52) U.S. Cl.
CPC .......... *H04L 47/2441* (2013.01); *H04L 47/20* (2013.01)

(58) Field of Classification Search
CPC ............................ H04L 47/2441; H04L 47/20
See application file for complete search history.

(56) References Cited

U.S. PATENT DOCUMENTS

| 6,510,509 | B1 * | 1/2003 | Chopra | ................... H04L 49/90 709/236 |
| 6,700,889 | B1 * | 3/2004 | Nun | ........................ H04L 47/29 370/392 |
| 8,854,996 | B2 | 10/2014 | Abel et al. | |
| 9,240,959 | B2 | 1/2016 | Park et al. | |
| 9,509,809 | B2 | 11/2016 | Laufer et al. | |
| 2005/0114337 | A1 | 5/2005 | Lunteren | |
| 2009/0154459 | A1 | 6/2009 | Husak | |
| 2014/0279805 | A1 | 9/2014 | Pangborn | |
| 2020/0267077 | A1 * | 8/2020 | Williams | ............ H04L 47/2441 |

(Continued)

OTHER PUBLICATIONS

Li, et al., "A Fast, Smart Packet Classification Algorithm Based on Decomposition", In Journal of Control Science and Engineering, Oct. 15, 2020, 11 Pages.

(Continued)

*Primary Examiner* — Benjamin M Thieu
(74) *Attorney, Agent, or Firm* — Han Gim; Newport IP, LLC

(57) ABSTRACT

The techniques disclosed herein enable systems to enhance network packet processing functionality through an accelerated packet classifier algorithm. Network packet classifiers serve to evaluate characteristics of network packets against various rules to determine how to process the network packet (e.g., routing, rewriting data). In contrast to existing systems, the present techniques pack a plurality of rules into a rule set which can then be applied to a network packet as a cohesive unit. By leveraging characteristics of binary arithmetic, the network packet classifier can evaluate the network packet against multiple rules in parallel. For example, the network packet classifier can concurrently compare values encoded by the network packet against a plurality of target ranges defined by the rules. This enables the network packet classifier to complete a full rule set evaluation within a single pass of the network packet thereby improving computing efficiency.

20 Claims, 7 Drawing Sheets

(56) References Cited

U.S. PATENT DOCUMENTS

2022/0321566 A1    10/2022   Coyle et al.

OTHER PUBLICATIONS

Li, et al., "CutSplit: A Decision-Tree Combining Cutting and Splitting for Scalable Packet Classification", In Proceedings of IEEE Infocom—IEEE Conference on Computer Communications, Oct. 11, 2018, pp. 2645-2653.
International Search Report and Written Opinion received for PCT Application No. PCT/US2024/023506, Jul. 25, 2024, 14 pages.

* cited by examiner

ACCELERATED NETWORK PACKET CLASSIFIER

BACKGROUND

As more data and services are stored and provided online via network connections, providing high performance and an optimal and reliable user experience is an important consideration for network providers and computer networking device manufacturers. In various examples, computer networking devices can include electronic devices that communicate and interact over a computer network via network packets such as gateways, routers, and switches. A network packets can be a formatted unit of data containing control information and user data. Such computer networking devices can implement software programs that process and execute network operations such as packet routing, rewriting, filtering and so forth.

One function of these network operations is packet classification which differentiates network packets based on various characteristics such as source address, destination address (e.g., an IP address), protocol type, and the like. These properties can be encoded by data fields of the network packet (e.g., a source address field, a protocol field). A set of these data fields can form a packet header for encoding control information of the network packet. Differentiating network packets in this way enables a network such as a software defined network (SDN) to implement different services and advanced functionality beyond simple destination-based routing. For instance, packet differentiation can enable a network to perform traffic shaping in which computer networking devices can route network packets to maintain a certain level of web traffic through a section of the network.

Generally described, a network packet classifier can be configured with rules which define various properties as well as actions to be performed on network packets that match the properties. For instance, a rule can specify a range of source addresses in which network packets that originate from those source addresses are filtered out. In this way, the network packet classifier can enforce access policies. However, as networking needs grow over time, a network packet classifier may be configured with several rules each defining one or more properties thus requiring analysis of many data fields. Existing approaches to network packet classification may not achieve acceptable performance for modern demands. It is with respect to these and other considerations that the disclosure made herein is presented.

SUMMARY

The techniques described herein enhance the functionality of computer networking devices by implementing a classification algorithm to accelerate network packet classifiers through rule sets. While the present disclosure is applicable to all types of packet classifiers, many of the described examples are illustrated in the context of feature-based network packet classifiers. Feature-based network packet classifiers can generally refer to classifiers that classify packets based on features that may be grouped into feature types, each corresponding to a different packet header field. For example, network packet classifiers can classify network packets based on ranges, arbitrary values (e.g., wildcards), as well as exact matches in various fields of a network packet header. Typical feature-based network packet classifiers are constructed to process one field at a time. Consequently, for rules with multiple fields processing a network packet in this way can be inefficient. These inefficiencies can be further exacerbated when a classifier is responsible for multiple rules.

In contrast to existing solutions, the disclosed techniques group a plurality of rules into a rule set. A rule set is formatted to suit various technical requirements such as register size. For instance, a network packet classifier can utilize advanced vector extension (AVX) such as AVX2 for 256-bit support, AVX-512 for 512-bit support, and so forth. In this way, the performance of the network packet classifier can be constrained by the physical characteristics of modern computing hardware rather than inefficiencies of the network packet classifier itself.

An individual rule of the rule set can define target data fields (e.g., source address, destination address, protocol) as well as target range for the target data fields. The target range further includes a minimum value and maximum value. In a specific example, a rule of the rule set can target network packets within a specific range of source internet protocol (IP) addresses, utilizing the transmission control protocol (TCP) while another rule can target network packets in another range of source IP addresses utilizing the user datagram protocol (UDP).

As further described below, the network packet classifier extracts the target data fields from a network packet for each rule of the rule set. For example, a first rule may target a source address and a protocol while a second rule targets a source address and a destination address. Accordingly, the network packet classifier can extract the source address, destination address, and protocol data fields from the network packet. This can be accomplished by applying preconfigured bitmasks to the network packet to isolate the desired data field. In addition, the system can utilize a field shuffle to pack the extracted data fields together for processing.

The network packet classifier can subsequently compare the values encoded by the extracted data fields against the target range defined by the rules. This can involve comparing the value encoded by the extracted data field against the minimum value and maximum value of the target range to determine that the value falls within the target range. In various examples, the minimum value and the maximum value of a target range can be different indicating a range of targeted values. Conversely, the minimum value and maximum value can be set to the same value to indicate that a rule targets an exact match (e.g., TCP).

After determining that values of the network packet fall within the target range of one or several rules, the network packet can be classified as a match to the rule. Accordingly, the network packet classifier executes an operation on the network packet based on an action defined by the matching rule. Actions can include outputting the network packet to a network interface, rewriting data within the packet, filtering the packet to deny access, and so forth. In addition, if the network packet does not match any rules of the rule set, the network packet classifier executes a default action such as outputting to a default network interface.

The techniques of the present disclosure enable several technical benefits over existing approaches. Namely, by enabling parallel processing of many rules, the network packet classifier algorithm discussed herein can dramatically improve processing speeds for computer networking devices. By accelerating a crucial component of computer networking as network packet classification, the performance improvements of the disclosed techniques can extend to overall network performance leading to increased network speeds and reduced network traffic. Moreover, by improving efficiency and performance, the disclosed system can reduce energy consumption and thereby environment impact for a given workload.

In another example of the technical benefit of the present disclosure, the system can improve performance and efficiency by storing data fields of the network packet in a packed representation. This in combination with packing a plurality of rules into a rule set, the system can reduce the number of main memory (e.g., RAM) accesses which are typically associated with increases in latency and thus a limitation on overall performance.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques discussed herein enhance the functionality of computer networking devices through an accelerated network packet classifier. As mentioned above, a plurality of rules can be formatted into a rule set. In various examples, the rule set can be configured for compatibility with various instruction sets such as advanced vector extension 2 (AVX2) and advanced vector extension 512 (AVX-512). The rule set can then be applied to a network packet as a cohesive process in which individual rules are processed in parallel. Stated another way, the plurality of rules of the rule set can be applied as an atomic operation to enable parallel evaluation of the rule set. As will be discussed below, this can be accomplished using a series of mathematical operations leveraging characteristics of binary operations.

Figure 1:
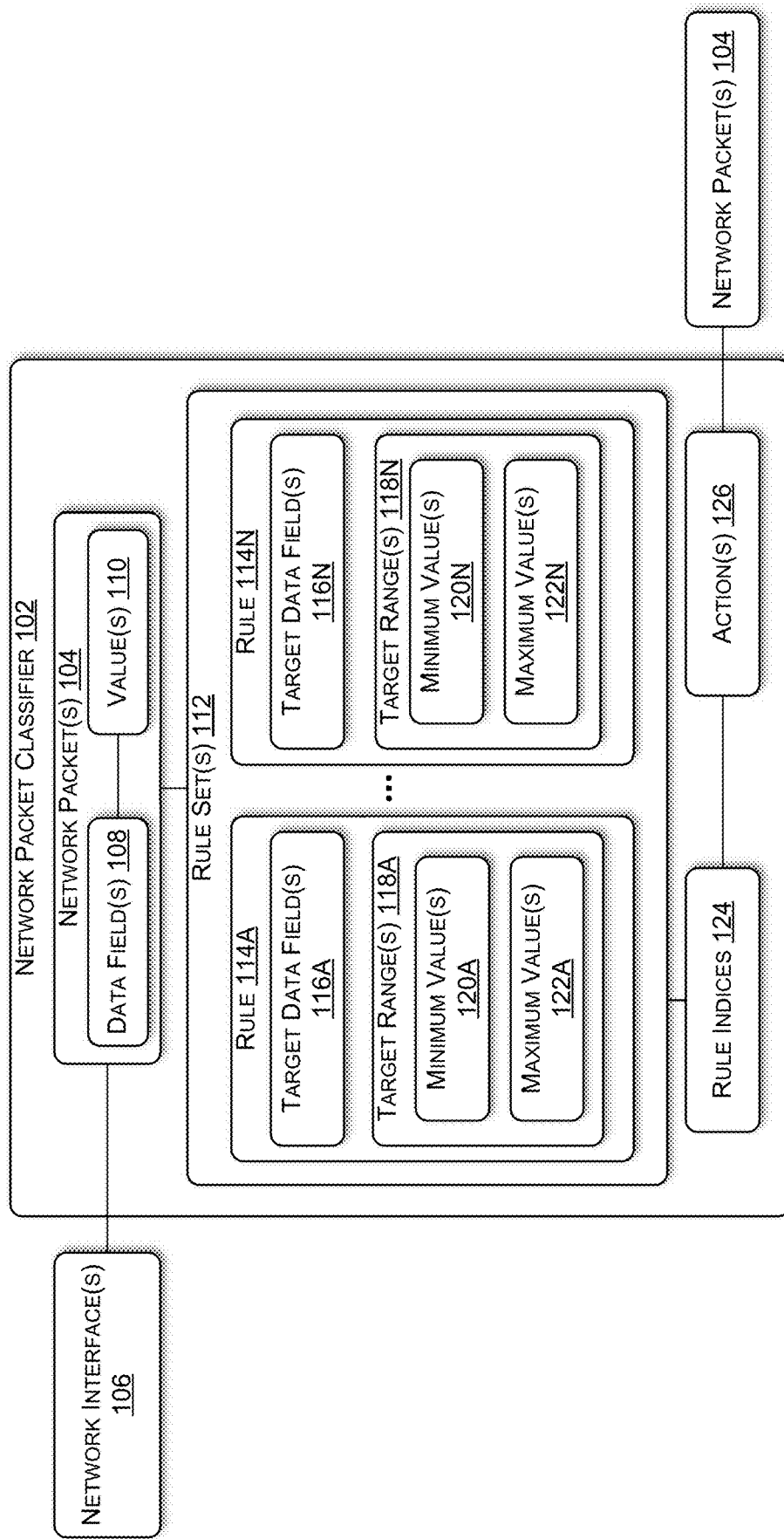
FIG. 1 is a block diagram of a system for classifying network packets through parallel processing of a plurality rules of a rule set.

FIG. 1 illustrates a system 100 for utilizing a feature-based network packet classifier 102 to classify and process a network packet 104. The network packet can be provided to the feature-based network packet classifier 102 via a network interface 106 such as a network interface controller (NIC). The network packet 104 can include a set of data fields 108, each data field 108 containing data encoding an associated value 110. In various examples, a subset of the data fields 108 can form a header that encodes control information defining characteristics of the network packet such as source address (e.g., an internet protocol [IP] address) and protocol (e.g., user data gram protocol [UDP]). Another data field 108 of the network packet 104 can contain user data also known as a payload. Moreover, the system 100 can be a component within a greater network of computer networking devices. Collectively, a series of packet classifiers can be referred to as a graph in which individual packet classifiers devices can be nodes. The topology of the graph can be referred to as a graph configuration and inform various aspects of computer networking devices within a network.

After receiving the network packet 104, the feature-based network packet classifier 102 can apply one or several rule sets 112 comprising a plurality of individual rules 114A-114N. Each rule can define one or several target data fields 116A-116N and an associated target range 118A-118N. A target range 118A can, in turn, define a minimum value 120A and a maximum value 122A. As mentioned above, the rule set 112 can be formatted for compatibility with various hardware constraints. In a specific example, the feature-based network packet classifier 102 can be implemented using the AVX2 functionalities of the X86 instruction set architecture. In an AVX2 context, an individual register can be 256 bits in length. Consequently, the maximum number of rules 114A-114N in a rule set 112 that the feature-based network packet classifier 102 can apply to the network packet 104 can be defined by a register of size of the present hardware domain. For scenarios in which more than the maximum number of rules 114A-114N are to be applied, multiple rule sets 112 can be utilized.

To process the network packet 104, the feature-based network packet classifier 102 can extract data fields 108 that match the target data fields 116A-116N. For example, the target data fields 116A of the rule 114A can target a source address and a protocol data field 108. Similarly, the target data fields 116N of the rule 114N can target a source address and a destination address. The feature-based network packet classifier 102 can accordingly extract the values 110 encoded by the source address, destination address, and protocol data fields 108 of the network packet 104.

The extracted values 110 can then be compared to the target ranges 118A-118N to determine if the network packet 104 matches any of the rules 114A-114N. The extracted values 110 can be compared to a corresponding minimum value 120A defined by the target range 118A to determine if the extracted value 110 is less than or equal to the minimum value 120A. Similarly, the extracted values 110 can be compared to a corresponding maximum value 122A defined by the target range 118A. If all the extracted values 110 satisfy their associated target ranges 118A, the network packet 104 can be considered a match for the rule 114A. In various examples, matching a network packet 104 to a rule 114A can be considered a "match action."

In response, the feature-based network packet classifier 102 can extract one or more rule indices 124 from the comparison against the rule set 112 to determine an action 126 to be executed on the network packet 104. In various examples, an action 126 can be defined by an associated rule 114A. In a specific example, the rule 114A can define a source IP address as the target data field 116, a range of IP addresses in the target range 118A, and an action 126 denying access to certain network resources to any network packets 104 originating from IP addresses within the target range 118A. The network packet 104 can be subsequently output by the feature-based network packet classifier 102 after the action 126 is executed.

Figure 2:
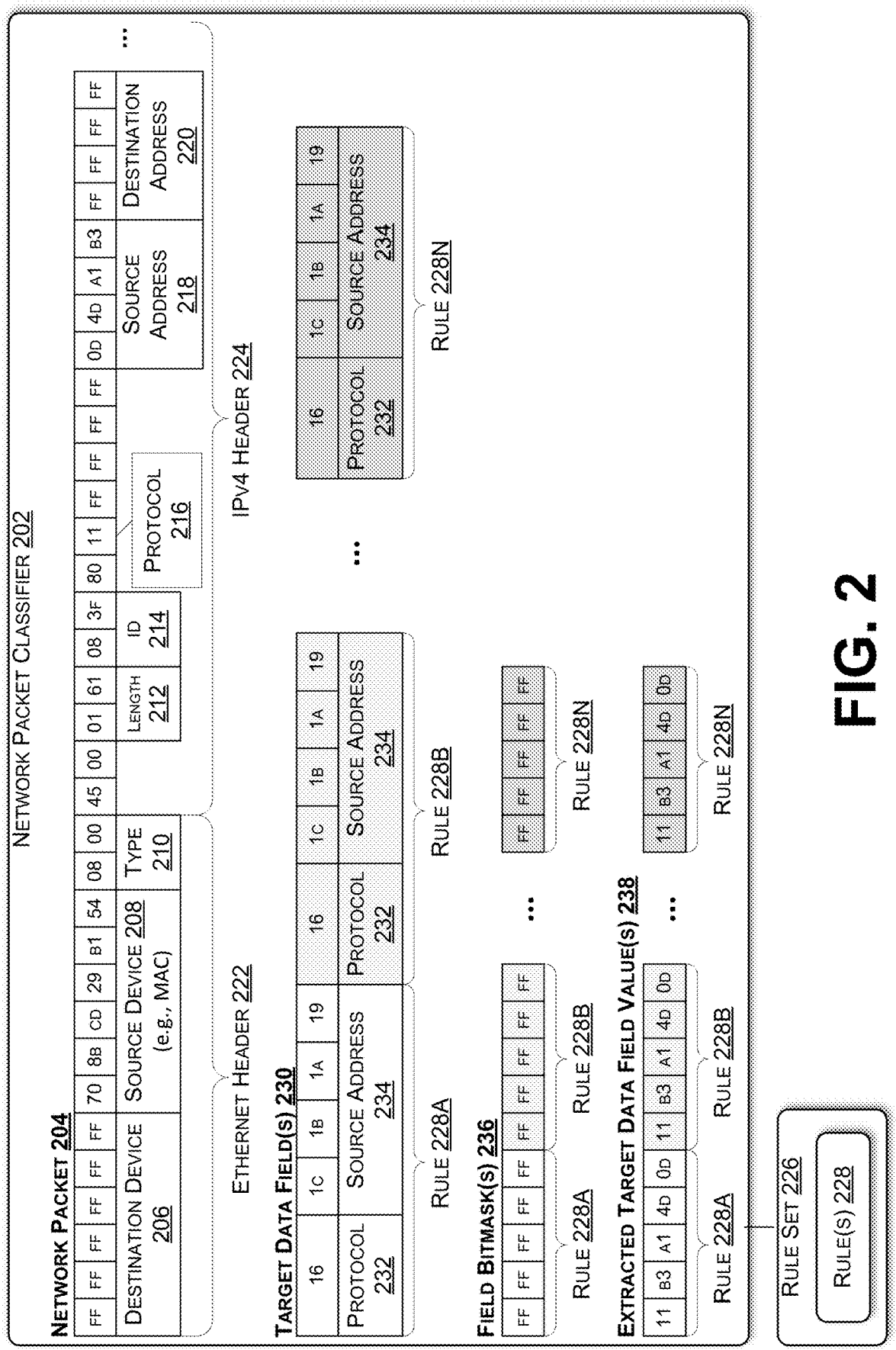
FIG. 2 illustrates an example of a feature-based network packet classifier in a first phase of processing a network packet.

Proceeding now to FIG. 2, an example of a feature-based network packet classifier 202 processing a network packet 204 is shown and described. As mentioned above, a network packet 204 can comprise several data fields 206-220. In addition, the data fields 206-220 can encode control information that is grouped and formatted for compatibility with common networking standards. For example, the data fields 206-210 can be standard fields of an ethernet header 222 in which the destination device data field 206 and source device data field 208 can be device identifiers such as a media access control (MAC) address and the type data field 210 can define an ethernet type.

Similarly, the data fields 212-220 can be components of an internet protocol version four (IPv4) header 224. Accordingly, the length data field 212 can define a length of the IPv4 header 224, the ID data field 214 can be a packet identifier in the event the network packet 204 is subdivided into several fragments. The protocol data field 216 can define which protocol the packet utilizes (e.g., TCP, UDP) while the source address data field 218 and destination address data field 220 can define addresses for various entities within a network such as an IP address. It should be understood that the data fields 206-222 illustrated in FIG. 2 are only for the sake of discussion, may not be the full extent of the data in a network packet 204, and that additional data fields may be included in the network packet 204 that are not illustrated.

Along with receiving the network packet 204, the feature-based network packet classifier 202 can receive a rule set 226 comprising a plurality of individual rules 228A-228N. As discussed above, an individual rule 228A can define one or several target data fields 230. For example, as shown in FIG. 2, the rule 228A can define a protocol target data field 232 and a source address target data field 234. The target data fields 230 can define a byte offset within the data fields 206-220 of the network packet 204. This offset can also be referred to as a field shuffle. For example, the protocol target data field 232 encodes a value of "0x16" in hexadecimal (22 in decimal) indicating that the protocol target data field 232 is targeting the twenty-second byte of the network packet 204, the protocol data fields 216. In another example, a target data field 230 can define several offsets (e.g., field shuffles) for a data field that spans multiple bytes such as the source address target data field 234 which targets the twenty-fifth through twenty-ninth bytes of the network packet 204. For the sake of discussion, the source address target data field 234 as shown in FIG. 2 extracts the source address data field 218 in reverse order. Hence, the offsets defined by the source address target data field 234 ascend in magnitude from right to left. In addition, for simplicity, the rules 228A-228N illustrated in FIG. 2 all define the same target data fields 230. However, it should be understood that different rules 228 within a rule set 226 can define different target data fields 230.

Like the target data fields 230, each rule 228A-228N can additionally define a field bitmask 236. In various examples, the field bitmask 236 can serve to extract a portion of a target data field 230 by performing a logical AND operation with the value encoded by the target data field 230 and the field bitmask 236. As such, a field bitmask 236 can be sized to match the target data fields 230. For example, the rule 228A defines a protocol target data field 232 and a source address target data field 234 which are respectively one byte and four bytes in size. Accordingly, the portion of the field bitmask 236 associated with the rule 228A can be five bytes in size. In the example of FIG. 2, the field bitmask 236 is configured to leave the values encoded by the target data fields 230 intact. That is, as configured in FIG. 2, the field bitmask 236 is the same across all of the rules 228 of the rule set 226 and does not filter out any portions of the values encoded by the target data fields 230.

Consequently, the extracted target data field values 238 can reflect those in the network packet 204. For instance, in the present example, the target data field 230 for the first byte of the rule 228A is the protocol data field 216 which encodes the value 0x11. As such, after applying the field bitmask 236, the extracted target data field value 238 for the first byte of the rule 228A can also be 0x11. As mentioned above, for target data fields 230 that are multiple bytes in size such as the source address target data field 234, the rule 228A can format the target data field 230 in an apparent reverse order. That is, the most significant byte of the target data field 230 is placed at the rightmost portion of the rule 228A often referred to as little-endian. In a specific example, the value encoded by the source address data field 218 as shown in FIG. 2 is 0x0D 4D A1 B3. After applying the offsets defined in the source address target data field 234, the extracted target data field value 238 for that portion of the rule 228 is accordingly, 0xB3 A1 4D 0D. However, it should be understood that extracted target data field values 238 can be formatted in any suitable way such as big-endian.

Figure 3:
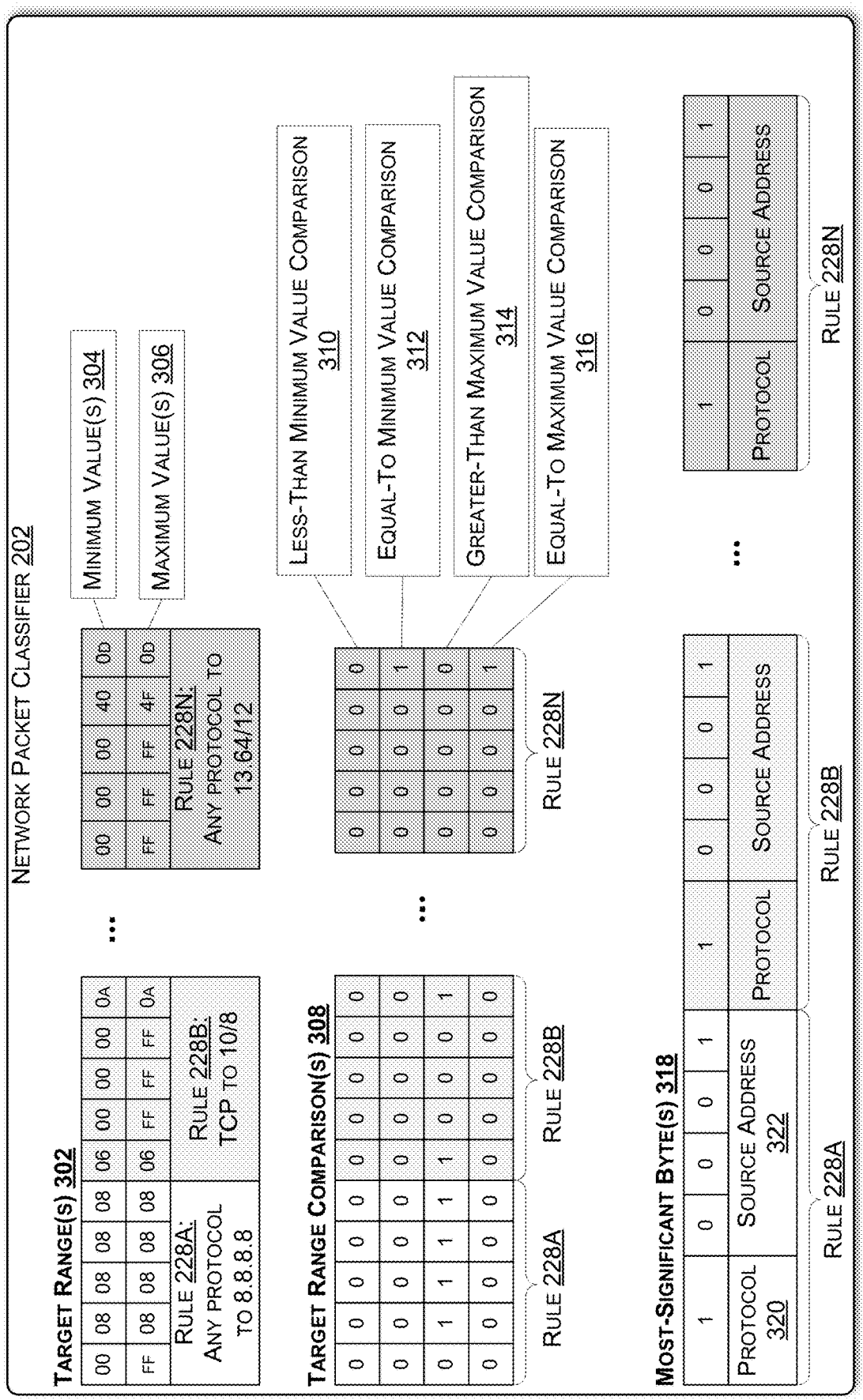
FIG. 3 illustrates an example of a feature-based network packet classifier in a second phase of processing the network packet.

Turning now to FIG. 3, a process for comparing the extracted target data field values 238 against a target range 302 defined each rule 228A-228N is shown and described. After acquiring the extracted target data field values 238 from the network packet, the feature-based network packet classifier 202 can compare the extracted target data field values 238 against the target ranges 302 defined by each rule 228A-228N. As a reminder for the present example, the first byte of each rule 228A-228N relates to the value encoded by the protocol data field 216 while the four remaining bytes relate to the source address data field 218. Accordingly, the first byte of the target range 302 for each rule 228A-228N is the target range for the protocol target data field 232 while the four remaining bytes of the target range relate to the source address target data field 234.

The target range 302 can define a minimum value 304 and a maximum value 306. In various examples, the minimum value and the maximum value can be configured as different values. For example, the first byte of the rule 228A defines a minimum value 304 of 0x00 and a maximum value 306 of 0xFF indicating that any protocol defined by the network packet 204 matches the target range 302 of the rule 228A. Conversely, the minimum value 304 and maximum value 306 can be configured as the same value to indicate that the rule 228A is seeking an exact match. For instance, the remaining four bytes of the rule 228A are configured with the same minimum value 304 and maximum value 306. As such, the rule 228A is targeting a network packet 204 originating from a source address of 8.8.8.8.

The feature-based network packet classifier 202 can subsequently perform a comparison of the extracted target data field values 238 against the target range 302. As will be elaborated upon below, the feature-based network packet classifier 202 can perform four calculations for generating the target range comparisons 308 to enable parallel processing for a plurality of rules 228A-228N. The first calculation can be a less-than minimum value comparison 310 in which the feature-based network packet classifier 202 determines, in a byte wise manner, if the extracted target data field values 238 fall below the minimum values 304 defined by the rules 228A-228N. Similarly, executing an equal-to minimum value comparison 312 can determine if the any of the extracted target data field values 238 are equal to the minimum values 304. The feature-based network packet classifier 202 can also perform this comparison for the maximum values 306 defined by the target ranges 302. As shown, a greater-than maximum value comparison 314 can indicate that the extracted target data field values 238 exceed the maximum values 306 while an equal-to maximum value comparison can indicate if the extracted target data field values 238 are equal to the maximum values 306.

To analyze the results of the target range comparisons 308, the feature-based network packet classifier 202 can be configured with a definition of the most-significant bytes 318 for the target data fields 230. In the present example, the protocol target data field 232 is only one byte in length and hence it is also the most significant byte 320. As mentioned above, the source address target data field 230 can be formatted in an apparent reverse order (e.g., small-endian) in which the most significant byte 322 for the source address target data field 234 is depicted at the rightmost position rather than the left. The most-significant bytes 318 can be derived from the configuration of the rules, characteristics of the network packet, and additional network factors.

Figure 4:
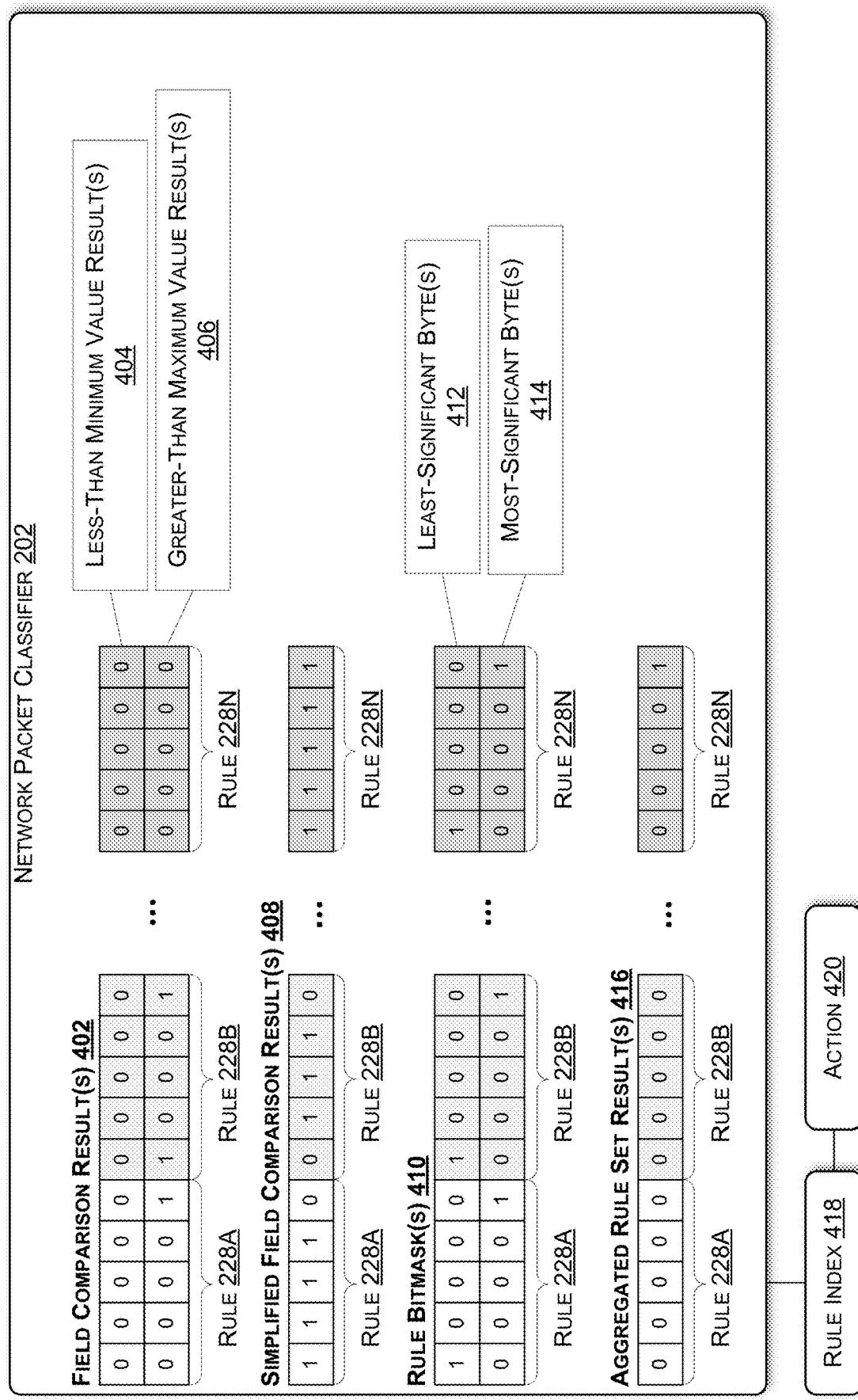
FIG. 4 illustrates an example of a feature-based network packet classifier in a first phase of processing a network packet.

Turning now to FIG. 4, the feature-based network packet classifier 202 can utilize the target range comparisons 308 to process the plurality of rules 228A-228N in the rule set 226 and generate a field comparison result 402 comprising a less-than minimum value result 404 and a greater-than maximum value result 406 indicating if, for a given rule 228A, the extracted target data field values 238 are out of the target range 302. As mentioned above, a bitmask can be any data that is configured to toggle one or more bits in a byte, word, or other unit of digital data. In the present example, the previously generated target range comparisons 308 can be utilized as bitmasks to calculate the rule comparison results 402.

The goal of this calculation is to determine, for a plurality of rules 228A-228N concatenated into a rule set 226, if the extracted target data field values 238 violate the target ranges 302 defined by the rules 228A-228N. In a specific example, the less-than minimum value result 404 can be calculated according to equation (1) below.

$$L' = \left(\left((E >> 1) \& \sim M\right) + L\right) \& M \quad \text{Equation (1)}$$

Where L' is the less-than minimum value result 404, (E>>1) is the equal to minimum value comparison 312 shifted right by one bit, ~M is the inverse of the most significant bytes 318, and L is the less-than minimum value comparison 310. In an illustrative example, consider the rule 228N where the less-than minimum value comparison 310 is "00000" while the equal-to minimum value comparison for the rule 228N is "00001" which, when shifted to the right by one bit, is "00000". In addition, the inverse of the most-significant bytes 318 for the rule 228N is "01110". Thus, equation (1) for calculating the less-than minimum value result 404 (L') for the rule 228N can be expressed as:

$$L' = \left(\left((00000) \& 01110\right) + 00000\right) \& 10001$$

Solving for L' results in L'=00000 indicating that the extracted target data field values 238 do not violate the minimum values 304 of the target range 302 for the rule 228N. Similarly, the greater-than maximum value result 406 can be calculated according to (equation 2) below.

$$G' = \left(\left((E >> 1) \& \sim M\right) + G\right) \& M \quad \text{Equation (2)}$$

Where G' is the greater-than maximum value result 406, (E>>1) is the equal-to maximum value comparison 312 shifted right by one bit, ~M is the inverse of the most significant bytes 318, and G is the greater-than maximum value comparison 314. Continuing with the illustrative example of the rule 228N above, the greater-than maximum value comparison 314 is "00000" while the equal-to maximum value comparison 316 is "00001" which results in "00000" when shifted to the right by one bit. In addition, the most-significant bytes 318 for the rule 228N remain the same at "10001" the inverse of which is "01110". Thus, equation (2) for calculating the greater-than maximum value result 406 (G') for the rule 228N can be expressed as:

$$G' = \left(\left((00000) \& \sim 10001\right) + 00000\right) \& 10001$$

Solving for G' results in G'=00000 indicating that the extracted target data field values 238 do not violate the maximum values 306 of the target range 302 for the rule 228N. In addition, it should be understood that the calculation of equation (1) and equation (2) can be performed for a plurality of rules 228A-228N in parallel. That is, a plurality of rules 228A-228N can be evaluated concurrently as discussed with respect to rule 228N. As mentioned above, a plurality of rules 228A-228N can be packed into a rule set 226. Packing the rules 228A-228N in this way enables the rule set 226 to be applied as a cohesive unit to a network packet 204. Stated another way, the plurality of rules 228A-228N of the rule set 226 can be applied as an atomic operation to enable parallel evaluation of the rule set 226. Performing these calculations for the full plurality of rules 228A-228N can result in the rule comparison results 402.

To streamline processing, the feature-based network packet classifier can generate a simplified rule comparison result 408 to express the less-than minimum value result 404 and the greater-than maximum value result 406 for in a compact format. In one example, the simplified rule comparison result 408 can be calculated by performing a logical OR operation on the less-than minimum value results 404 and the greater-than maximum value results 406 and taking the inverse of the result.

Formatting the simplified field comparison results 408 in this way enables the feature-based network packet classifier 202 to perform further analysis using a set of rule bitmasks 410 defining the most-significant byte 412 and least-significant byte 414 of each rule 228. In the present example, as discussed above, the first byte of each rule bitmask 410 can relate to the protocol target data field 232 while the four succeeding bytes can relate to the source address target data field 234. Since each rule 228A-228N defines the same target data fields 230, the rule bitmasks 410 can likewise be the same for each rule 228A-228N. In addition, the rule bitmasks 410 can be preconfigured based on a network graph configuration.

Finally, the feature-based network packet classifier 202 can calculate an aggregate rule set result 416 using the simplified field comparison results 408 and the rule bitmasks 410. The goal of this calculation is to determine if, for each rule 228A-228N, the simplified rule comparison result 408 comprises all ones (e.g., "11111"). This can indicate that the extracted target data field values 238 satisfies the target range 302. In one example, the aggregate rule set results 416 can be calculated using equation (3) below.

$$Y = ((X \mathbin{\&} {\sim}M) + L) \mathbin{\&} M \qquad \text{Equation (3)}$$

Where Y is the aggregated rule set result 416, X is the simplified rule comparison result 408, M is the most-significant byte 414 of each rule 228A-228N, and L is the least-significant byte 412 of each rule 228A-228N as defined by the rule bitmasks 410. In a specific example, the simplified field comparison results 408 for a rule 228N can be "11111" as shown in FIG. 4. In addition, the least-significant byte of the rule 228N is "10000" while the most-significant byte 414 is "00001" which, when inverted, is "11110". As such, equation (3) for the present example can be expressed as:

$$Y = ((11111 \mathbin{\&} 11110) + 10000) \mathbin{\&} 00001$$

Solving for Y results in Y=00001. The feature-based network packet classifier 202 can determine if any of the rules 228A-228N in the aggregated rule set result 416 are non-zero indicating that the network packet 204 is a match for the non-zero rule 228N. If a rule 228N is non-zero, the feature-based network packet classifier 202 can proceed to extract the most-significant byte 414 of the non-zero rule 228N. Furthermore, the feature-based network packet classifier 202 can find a rule index 418 associated with the non-zero rule 228N which can be associated with an action 420 (e.g., packet routing, data rewriting). In various examples, the rule index 418 can be determined based on the position of the rule 228N in the rule set 226. For example, if the rule 228N is the fifth rule 228 in the rule set 226, the rule index can be "5".

As mentioned above, by leveraging characteristics of binary arithmetic, the feature-based network packet classifier 202 can generate an aggregated rule set result 416 that represents an analysis of the network packet 204 through a plurality of rules 228A-228N. In this way, the feature-based network packet classifier 202 can apply the full plurality of rules 228A-228N in parallel within a single pass of the network packet 204, thereby improving computing efficiency. Stated another way, the plurality of rules 228A-228N of the rule set 226 can be applied as an atomic operation to enable parallel evaluation of the rule set 226.

Figure 5:
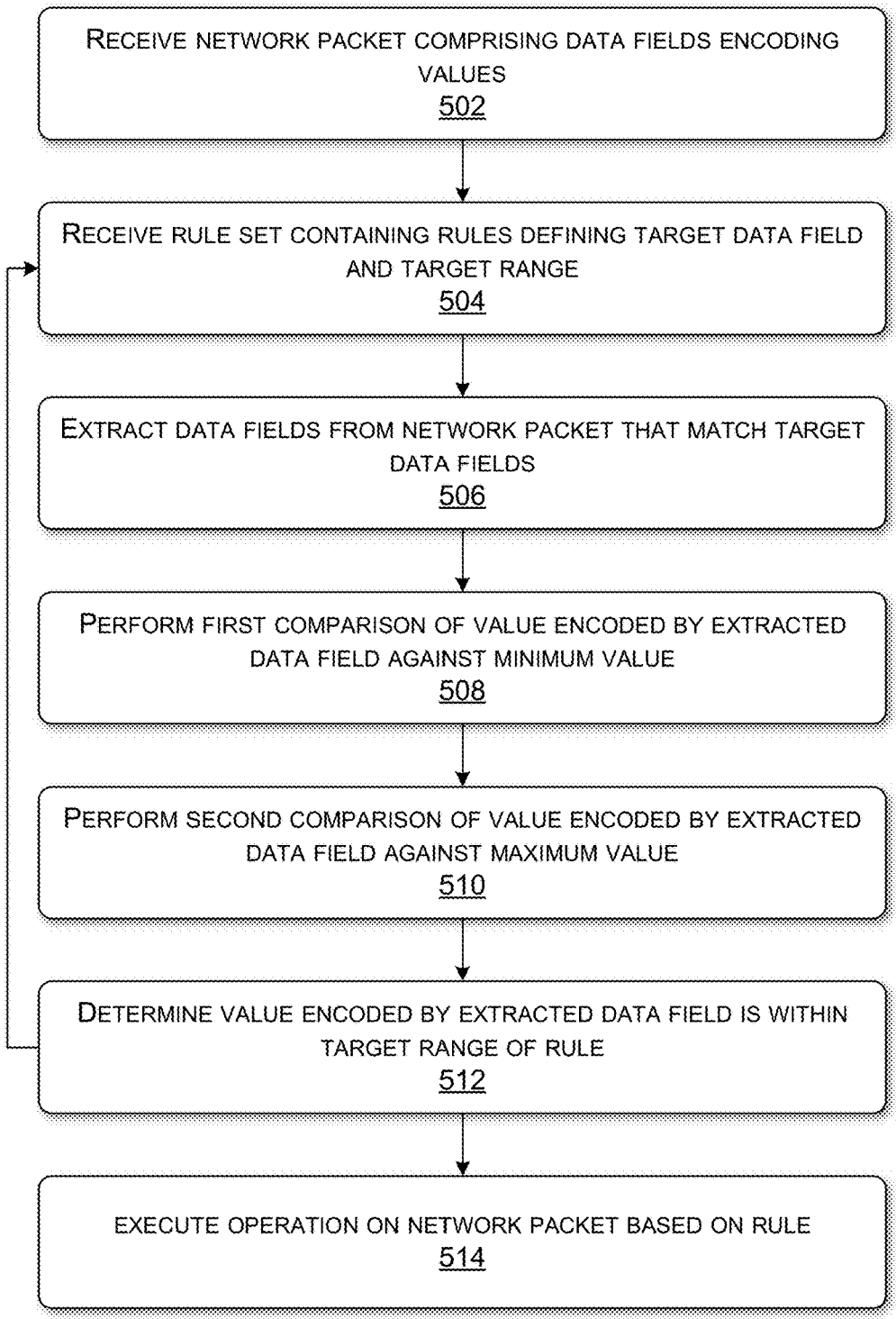
FIG. 5 is a flow diagram showing aspects of a routine for classifying a network packet through parallel processing of a plurality rules of a rule set.

Proceeding now to FIG. 5, aspects of a routine 500 for performing accelerated feature-based network packet classification are shown and described. With reference to FIG. 5, at operation 502, a feature-based network packet classifier receives a network packet comprising a plurality of data fields each encoding a value (e.g., protocol, source address).

At operation 504, the feature-based network packet classifier receives a rule set containing a plurality of rules. Each rule can define a target data field and target range including a minimum value and maximum value for the value encoded by the target data field.

At operation 506, the feature-based network packet classifier extracts a data field from the network packet that matches the target data field for each rule of the rule set.

At operation 508, the feature-based network packet classifier compares the value encoded by the extracted data field against the minimum value of the target range for each rule.

At operation 510, the feature-based network packet classifier compares the value encoded by the extracted data field against the maximum value of the target range for each rule.

At operation 512, the feature-based network packet classifier determines that, based on the comparison against the minimum value and maximum values of the target range, the value encoded by the extracted data field is within the target range of at least one of the rules. In various examples, operations 504-512 may be repeatedly executed as needed. For instance, a large group of rules (e.g., a thousand rules) may require several separate rule sets to fully process. As such, each rule set can be applied to the network packet and processed according to operations 504-512.

At operation 514, in response to determining that the value encoded by the extracted data field is within the target range of a given rule of the rule set, the system executes an action on the network packet based on the given rule of the rule set, wherein the plurality of rules of the rule set are applied to the network packet as an atomic process to enable parallel evaluation of the rule set. Moreover, the operations of 500 can be performed in parallel for a plurality of network packets. In various examples, applying a rule set to a plurality of network packets can be referred to as a burst.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the routine 500 may be also implemented in other ways. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 6:
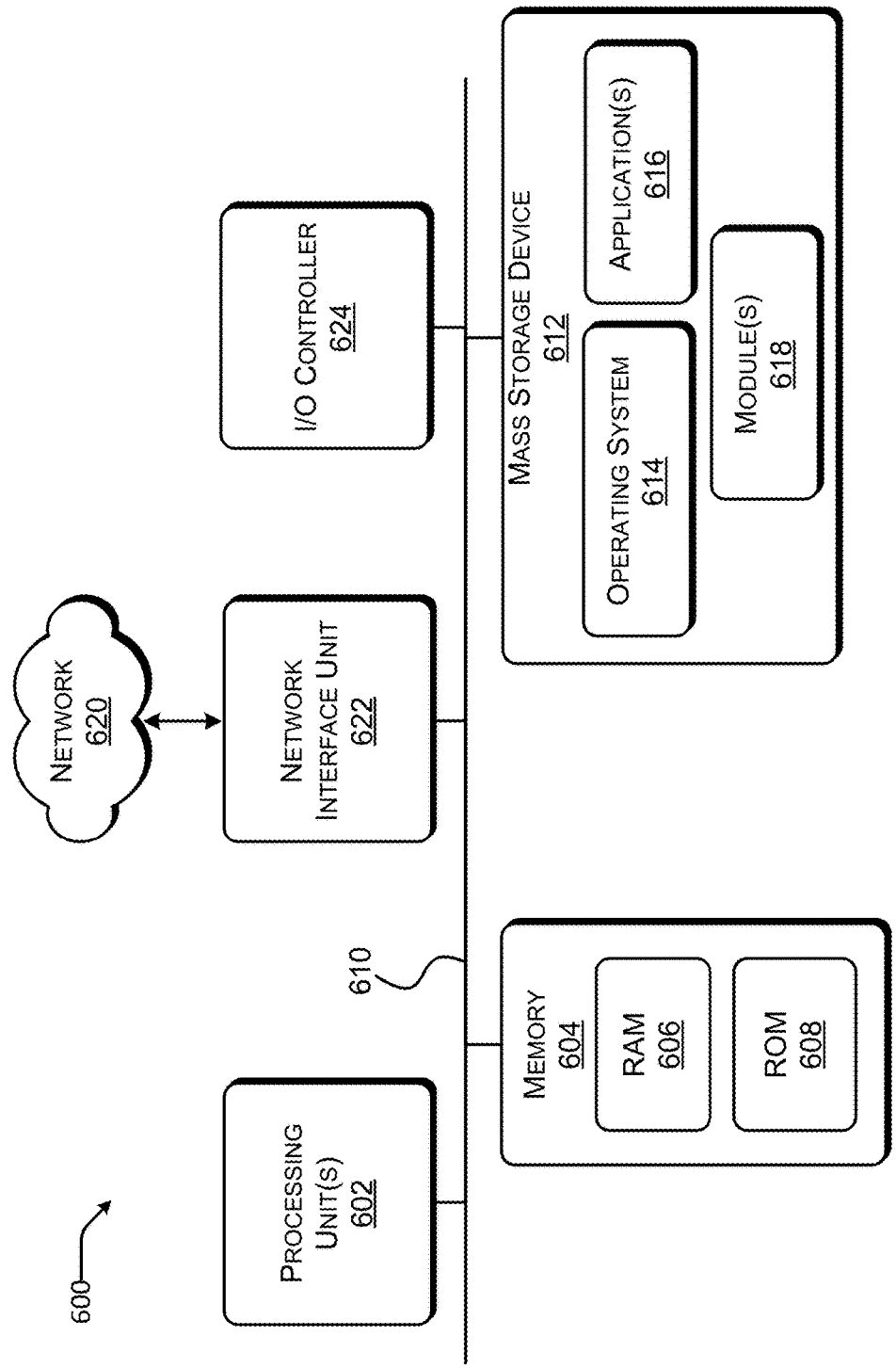
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the cloud-based platform or system 100, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen.

Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

Figure 7:
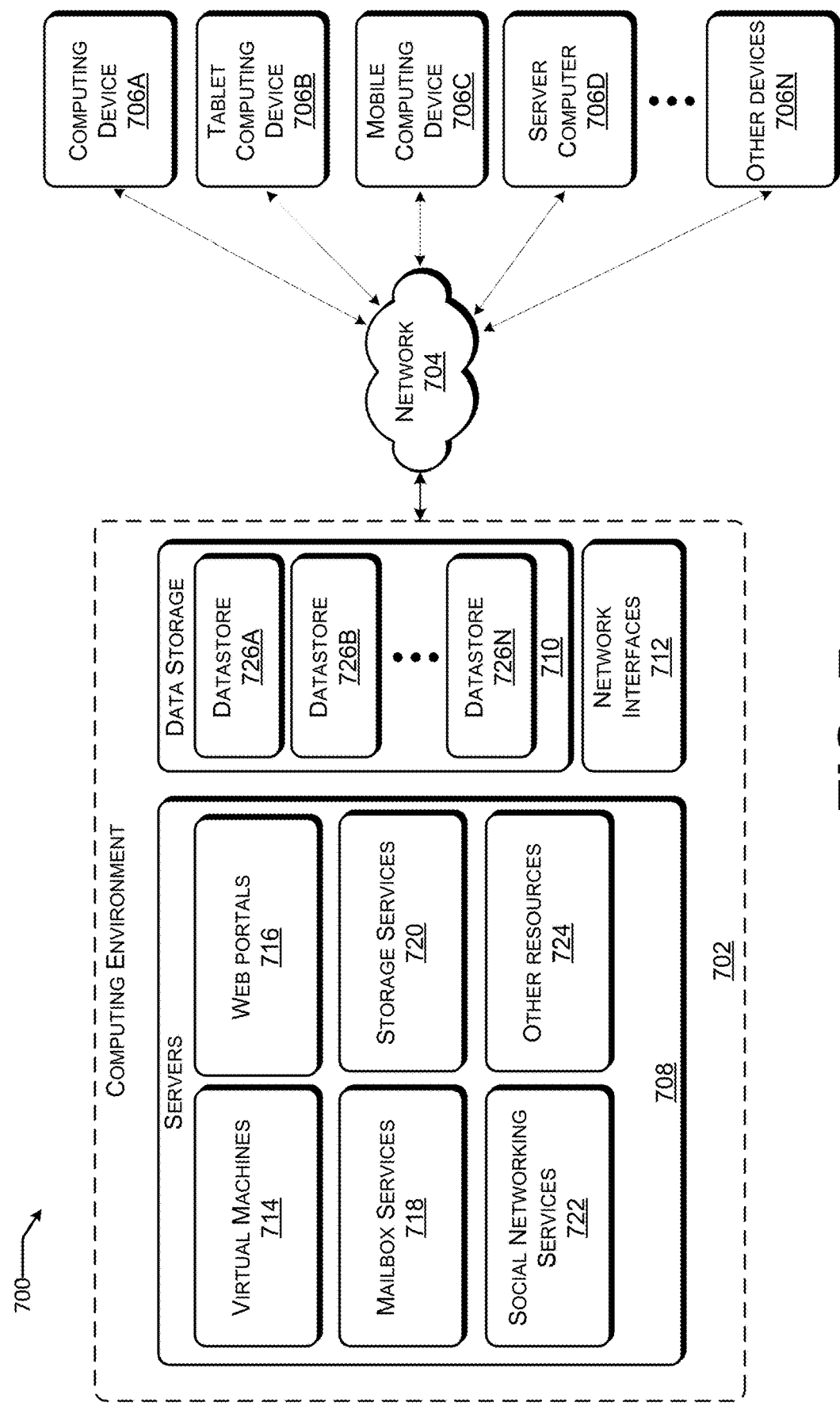
FIG. 7 is a diagram illustrating a distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "computing devices 706") can communicate with the computing environment 702 via the network 704. In one illustrated configuration, the computing devices 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of computing devices 706 can communicate with the computing environment 702.

In various examples, the computing environment 702 includes servers 708, data storage 710, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a method for processing network packets by a packet processing function in a computing device operating in a computing network environment, the packet processing function executing a packet classifier configured to classify network packets based on features grouped into feature types corresponding to header fields of the network packets, the computing device having a processor associated with a register and instruction set, the method comprising: receiving a network packet comprising a plurality of data fields, each of the data fields encoding a value; receiving a rule set containing a plurality of rules, each of the rules defining a target data field and a target range comprising a minimum value for the target data field and a maximum value for the target data field; loading the rule set into the register of the processor, wherein the plurality of rules of the rule set are configured to fit within a size of the register; using the associated instruction set to apply the rule set to the network packet by: for a given rule of the rule set: extracting one of the data fields from the network packet that matches a target data field corresponding to the given rule; performing a first comparison of a corresponding value encoded by the extracted data field to a minimum value for the matching target data field; performing a second comparison of the corresponding value encoded by the extracted data field to a maximum value for the matching target data field; and determining, based on the first and second comparison, that the value encoded by the extracted data field is within the target range of the given rule of the rule set; and in response to determining that the value encoded by the extracted data field is within the target range of the given rule of the rule set, executing an action on the network packet based on the given rule of the rule set, wherein the plurality of rules of the rule set are applied to the network packet as an atomic process in the processor to enable parallel application of the rule set to the network packet.

Example Clause B, the method of Example Clause A, wherein: the target data field for each rule of the plurality of rules is a same target data field; and extracting one of the data fields comprises applying a preconfigured field shuffle and a field bitmask to the network packet.

Example Clause C, the method of Example Clause A or Example Clause B, wherein performing the first comparison comprises: determining if the value is less than the minimum value; determining if the value is equal to the minimum value; and generating an overall minimum result based on determining if the value is less than the minimum value and determining if the value is equal to the minimum value, wherein the overall minimum result is generated for the plurality of rules of the rule set in parallel.

Example Clause D, the method of any one of Example Clause A through C, wherein performing the second comparison comprises: determining if the value is greater than the maximum value; determining if the value is equal to the maximum value; and generating an overall maximum result based on determining if the value is greater than the maximum value and determining if the value is equal to the maximum value wherein the overall maximum result is generated for the plurality of rules of the rule set in parallel.

Example Clause E, the method of any one of Example Clause A through D, wherein determining that the value encoded by the extracted data field is within the target range of the given rule of the rule set comprises: receiving an overall minimum result and an overall maximum result; applying a rule set bitmask to the overall minimum result and the overall maximum result to generate an aggregated rule set result, wherein the rule set bitmask is derived from a most significant byte and a least significant byte of each rule of the rule set; and determining, for the plurality of rules of the rule set, that the value encoded by the extracted data field is within the target range of one or more rules of the rule set based on the aggregated rule set result.

Example Clause F, the method of any one of Example Clause A through E, wherein the action executed on the network packet is a transmission from a first network entity to a second network entity.

Example Clause G, the method of any one of Example Clause A through E, wherein the action executed on the network packet is a denial of access to a network resource.

Example Clause H, a system for classifying and processing network packets in a computing network environment, the system comprising: a processing unit; and a computer readable medium having encoded thereon computer readable instructions that when executed by the processing unit cause the system to: receive a network packet comprising a plurality of data fields, each of the data fields encoding a value; receive a rule set containing a plurality of rules, each of the rules defining a target data field and a target range comprising a minimum value for the target data field and a maximum value for the target data field; apply the rule set to the network packet by: for a given rule of the rule set: extract one of the data fields from the network packet that matches a target data field corresponding to the given rule; perform a first comparison of a corresponding value encoded by the extracted data field to a minimum value for the matching target data field; perform a second comparison of the corresponding value encoded by the extracted data field to a maximum value for the matching target data field; and determine, based on the first and second comparison, that the value encoded by the extracted data field is within the target range of the given rule of the rule set; and in response to determining that the value encoded by the extracted data field is within the target range of the given rule of the rule set, execute an action on the network packet based on the given rule of the rule set, wherein the plurality of rules of the rule set are applied to the network packet as an atomic process to enable parallel evaluation of the rule set.

Example Clause I, the system of Example Clause H, wherein extracting one of the data fields from the network packet comprises applying a preconfigured field shuffle and field bitmask to the network packet.

Example Clause J, the system of Example Clause H or Example Clause I, wherein performing the first comparison comprises: determining if the value is less than the minimum value; determining if the value is equal to the minimum value; and generating an overall minimum result based on determining if the value is less than the minimum value and determining if the value is equal to the minimum value wherein the overall minimum result is generated for the plurality of rules of the rule set in parallel.

Example Clause K, the system of any one of Example Clause H through J, wherein performing the second comparison comprises: determining if the value is greater than the maximum value; determining if the value is equal to the maximum value; and generating an overall maximum result based on determining if the value is greater than the maximum value and determining if the value is equal to the maximum value wherein the overall maximum result is generated for the plurality of rules in parallel.

Example Clause L, the system of any one of Example Clause H through K, wherein determining that the value encoded by the extracted data field is within the target range of one or more rules of the rule set comprises: receiving an overall minimum result and an overall maximum result; applying a rule set bitmask to the overall minimum result and the overall maximum result to generate an aggregated rule set result, wherein the rule set bitmask is derived from a most significant byte and a least significant byte of the target data field of each rule of the rule set; and determining, from the aggregated rule set result, that the value encoded by the extracted data field is within the target range of one or more rules of the rule set.

Example Clause M, the system of any one of Example Clause H through L, wherein the action executed on the network packet is a transmission from a first network entity to a second network entity.

Example Clause N, the system of any one of Example Clause H through L, wherein the action executed on the network packet is a denial of access to a network resource.

Example Clause O, a computer readable storage medium having encoded thereon computer readable instructions that when executed by a system cause the system to: receive a network packet comprising a plurality of data fields, each of the data fields encoding a value; receive a rule set containing a plurality of rules, each of the rules defining a target data field and a target range comprising a minimum value for the target data field and a maximum value for the target data field; apply the rule set to the network packet by: for a given rule of the rule set: extract one of the data fields from the network packet that matches a target data field corresponding to the given rule; perform a first comparison of a corresponding value encoded by the extracted data field to a minimum value for the matching target data field; perform a second comparison of the corresponding value encoded by the extracted data field to a maximum value for the matching target data field; and determine, based on the first and second comparison, that the value encoded by the extracted data field is within the target range of the given rule of the rule set; and in response to determining that the value encoded by the extracted data field is within the target range of the given rule of the rule set, execute an action on the network packet based on the given rule of the rule set, wherein the plurality of rules of the rule set are applied to the network packet as an atomic process to enable parallel evaluation of the rule set.

Example Clause P, the computer readable storage medium of Example Clause O, wherein extracting the data field comprises applying a preconfigured field shuffle and field bitmask to the network packet.

Example Clause Q, the computer readable storage medium of Example Clause O or Example Clause P, wherein performing the first comparison comprises: determining if the value is less than the minimum value; determining if the value is equal to the minimum value; and generating an overall minimum result based on determining if the value is less than the minimum value and determining if the value is equal to the minimum value wherein the overall minimum result is generated for the plurality of rules of the rule set in parallel.

Example Clause R, the computer readable storage medium of any one of Example Clause O through Q, wherein performing the second comparison comprises: determining if the value is greater than the maximum value; determining if the value is equal to the maximum value; and generating an overall maximum result based on determining if the value is greater than the maximum value and determining if the value is equal to the maximum value wherein the overall maximum result is generated for the plurality of rules of the rule set in parallel.

Example Clause S, wherein determining that the value encoded by the extracted data field is within the target range of one or more rules of the rule set comprises: receiving an overall minimum result and an overall maximum result; applying a rule set bitmask to the overall minimum result and the overall maximum result to generate an aggregated rule set result, wherein the rule set bitmask is derived from a most significant byte and a least significant byte of the target data field of each rule of the rule set; and determining, from the aggregated rule set result, that the value encoded by the extracted data field is within the target range of one or more rules of the rule set.

Example Clause T, the computer readable storage medium of any one of Example Clause O through S, wherein the action executed on the network packet is a transmission from a first network entity to a second network entity.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different rules).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for processing network packets by a packet processing function in a computing device operating in a computing network environment, the packet processing function executing a packet classifier configured to classify network packets based on features grouped into feature types corresponding to header fields of the network packets, the computing device having a processor associated with a register and instruction set, the method comprising:
receiving a network packet comprising a plurality of data fields, each of the data fields encoding a value;
receiving a rule set containing a plurality of rules, each of the rules defining a target data field and a target range comprising a minimum value for the target data field and a maximum value for the target data field;
loading the rule set into the register of the processor, wherein the plurality of rules of the rule set are configured to fit within a size of the register;
using the associated instruction set to apply the rule set to the network packet by:
for a given rule of the rule set:
extracting one of the data fields from the network packet that matches a target data field corresponding to the given rule;
performing a first comparison of a corresponding value encoded by the extracted data field to a minimum value for the matching target data field;
performing a second comparison of the corresponding value encoded by the extracted data field to a maximum value for the matching target data field; and
determining, based on the first and second comparison, that the value encoded by the extracted data field is within the target range of the given rule of the rule set; and
in response to determining that the value encoded by the extracted data field is within the target range of the given rule of the rule set, executing an action on the network packet based on the given rule of the rule set, wherein the plurality of rules of the rule set are applied to the network packet as an atomic process in the processor to enable parallel application of the rule set to the network packet.

2. The method of claim 1, wherein:
the target data field for each rule of the plurality of rules is a same target data field; and extracting one of the data fields comprises applying a preconfigured field shuffle and a field bitmask to the network packet.

3. The method of claim 1, wherein performing the first comparison comprises:
  determining if the value is less than the minimum value;
  determining if the value is equal to the minimum value; and
  generating an overall minimum result based on determining if the value is less than the minimum value and determining if the value is equal to the minimum value, wherein the overall minimum result is generated for the plurality of rules of the rule set in parallel.

4. The method of claim 1, wherein performing the second comparison comprises:
  determining if the value is greater than the maximum value;
  determining if the value is equal to the maximum value; and
  generating an overall maximum result based on determining if the value is greater than the maximum value and determining if the value is equal to the maximum value wherein the overall maximum result is generated for the plurality of rules of the rule set in parallel.

5. The method of claim 1, wherein determining that the value encoded by the extracted data field is within the target range of the given rule of the rule set comprises:
  receiving an overall minimum result and an overall maximum result;
  applying a rule set bitmask to the overall minimum result and the overall maximum result to generate an aggregated rule set result, wherein the rule set bitmask is derived from a most significant byte and a least significant byte of each rule of the rule set; and
  determining, for the plurality of rules of the rule set, that the value encoded by the extracted data field is within the target range of one or more rules of the rule set based on the aggregated rule set result.

6. The method of claim 1, wherein the action executed on the network packet is a transmission from a first network entity to a second network entity.

7. The method of claim 1, wherein the action executed on the network packet is a denial of access to a network resource.

8. A system for classifying and processing network packets in a computing network environment, the system comprising:
  a processing unit; and
  a computer readable medium having encoded thereon computer readable instructions that when executed by the processing unit cause the system to:
    receive a network packet comprising a plurality of data fields, each of the data fields encoding a value;
    receive a rule set containing a plurality of rules, each of the rules defining a target data field and a target range comprising a minimum value for the target data field and a maximum value for the target data field;
    apply the rule set to the network packet by:
      for a given rule of the rule set:
        extract one of the data fields from the network packet that matches a target data field corresponding to the given rule;
        perform a first comparison of a corresponding value encoded by the extracted data field to a minimum value for the matching target data field;
        perform a second comparison of the corresponding value encoded by the extracted data field to a maximum value for the matching target data field; and
      determine, based on the first and second comparison, that the value encoded by the extracted data field is within the target range of the given rule of the rule set; and
    in response to determining that the value encoded by the extracted data field is within the target range of the given rule of the rule set, execute an action on the network packet based on the given rule of the rule set, wherein the plurality of rules of the rule set are applied to the network packet as an atomic process to enable parallel evaluation of the rule set.

9. The system of claim 8, wherein extracting one of the data fields from the network packet comprises applying a preconfigured field shuffle and field bitmask to the network packet.

10. The system of claim 8, wherein performing the first comparison comprises:
  determining if the value is less than the minimum value;
  determining if the value is equal to the minimum value; and
  generating an overall minimum result based on determining if the value is less than the minimum value and determining if the value is equal to the minimum value wherein the overall minimum result is generated for the plurality of rules of the rule set in parallel.

11. The system of claim 8, wherein performing the second comparison comprises:
  determining if the value is greater than the maximum value;
  determining if the value is equal to the maximum value; and
  generating an overall maximum result based on determining if the value is greater than the maximum value and determining if the value is equal to the maximum value wherein the overall maximum result is generated for the plurality of rules in parallel.

12. The system of claim 8, wherein determining that the value encoded by the extracted data field is within the target range of one or more rules of the rule set comprises:
  receiving an overall minimum result and an overall maximum result;
  applying a rule set bitmask to the overall minimum result and the overall maximum result to generate an aggregated rule set result, wherein the rule set bitmask is derived from a most significant byte and a least significant byte of the target data field of each rule of the rule set; and
  determining, from the aggregated rule set result, that the value encoded by the extracted data field is within the target range of one or more rules of the rule set.

13. The system of claim 8, wherein the action executed on the network packet is a transmission from a first network entity to a second network entity.

14. The system of claim 8, wherein the action executed on the network packet is a denial of access to a network resource.

15. A computer readable storage medium having encoded thereon computer readable instructions that when executed by a system cause the system to:
  receive a network packet comprising a plurality of data fields, each of the data fields encoding a value;
  receive a rule set containing a plurality of rules, each of the rules defining a target data field and a target range comprising a minimum value for the target data field and a maximum value for the target data field;
apply the rule set to the network packet by:
for a given rule of the rule set:
extract one of the data fields from the network packet that matches a target data field corresponding to the given rule;
perform a first comparison of a corresponding value encoded by the extracted data field to a minimum value for the matching target data field;
perform a second comparison of the corresponding value encoded by the extracted data field to a maximum value for the matching target data field; and
determine, based on the first and second comparison, that the value encoded by the extracted data field is within the target range of the given rule of the rule set; and
in response to determining that the value encoded by the extracted data field is within the target range of the given rule of the rule set, execute an action on the network packet based on the given rule of the rule set, wherein the plurality of rules of the rule set are applied to the network packet as an atomic process to enable parallel evaluation of the rule set.

16. The computer readable storage medium of claim 15, wherein extracting the data field comprises applying a preconfigured field shuffle and field bitmask to the network packet.

17. The computer readable storage medium of claim 15, wherein performing the first comparison comprises:
determining if the value is less than the minimum value;
determining if the value is equal to the minimum value; and
generating an overall minimum result based on determining if the value is less than the minimum value and determining if the value is equal to the minimum value wherein the overall minimum result is generated for the plurality of rules of the rule set in parallel.

18. The computer readable storage medium of claim 15, wherein performing the second comparison comprises:
determining if the value is greater than the maximum value;
determining if the value is equal to the maximum value; and
generating an overall maximum result based on determining if the value is greater than the maximum value and determining if the value is equal to the maximum value wherein the overall maximum result is generated for the plurality of rules of the rule set in parallel.

19. The computer readable storage medium of claim 15, wherein determining that the value encoded by the extracted data field is within the target range of one or more rules of the rule set comprises:
receiving an overall minimum result and an overall maximum result;
applying a rule set bitmask to the overall minimum result and the overall maximum result to generate an aggregated rule set result, wherein the rule set bitmask is derived from a most significant byte and a least significant byte of the target data field of each rule of the rule set; and
determining, from the aggregated rule set result, that the value encoded by the extracted data field is within the target range of one or more rules of the rule set.

20. The computer readable storage medium of claim 15, wherein the action executed on the network packet is a transmission from a first network entity to a second network entity.

* * * * *